(12) United States Patent
Duschek et al.

(10) Patent No.: US 8,703,894 B2
(45) Date of Patent: Apr. 22, 2014

(54) FLUOROCARBON POLYMER-FREE PREPARATIONS BASED ON WATER AND/OR ORGANIC SOLVENTS AND THE USE THEREOF AS A FINISH ON FLAT MATERIALS

(75) Inventors: Gunther Duschek, Benediktbeuren (DE); Dirk Sielemann, Munich (DE)

(73) Assignee: Rudolf GmbH & Co. KG Chemische Fabrik, Geretsried (DE)

( * ) Notice: Subject to any disclaimer, the term of this patent is extended or adjusted under 35 U.S.C. 154(b) by 993 days.

(21) Appl. No.: 12/598,724

(22) PCT Filed: Apr. 29, 2008

(86) PCT No.: PCT/EP2008/003478
§ 371 (c)(1),
(2), (4) Date: Mar. 31, 2010

(87) PCT Pub. No.: WO2008/135208
PCT Pub. Date: Nov. 13, 2008

(65) Prior Publication Data
US 2010/0190397 A1     Jul. 29, 2010

(30) Foreign Application Priority Data
May 3, 2007 (DE) .......................... 10 2007 020 790

(51) Int. Cl.
*C08G 77/388* (2006.01)
(52) U.S. Cl.
USPC .............................................. 528/28; 528/26
(58) Field of Classification Search
USPC ..................................................... 528/26, 28
See application file for complete search history.

(56) References Cited

U.S. PATENT DOCUMENTS

| | | |
|---|---|---|
| 3,389,160 A | 6/1968 | Wallace |
| 4,098,701 A | 7/1978 | Burrill et al. |
| 4,154,714 A | 5/1979 | Hockemeyer et al. |
| 5,493,041 A | 2/1996 | Biggs et al. |
| 5,578,692 A | 11/1996 | Biggs et al. |
| 2004/0219371 A1 | 11/2004 | Will et al. |
| 2005/0085573 A1 | 4/2005 | Sandner et al. |

FOREIGN PATENT DOCUMENTS

| | | | |
|---|---|---|---|
| DE | 1 001 965 | 2/1957 | |
| DE | 1 017 133 | 10/1957 | |
| DE | 1 493 384 | 1/1969 | |
| DE | 20 38 705 | 2/1971 | |
| DE | 33 32 997 A1 | 3/1985 | |
| DE | 44 41 418 A1 | 5/1996 | |
| DE | 197 44 612 A1 | 4/1999 | |
| DE | 100 17 651 A1 | 10/2001 | |
| DE | 101 39 126 A1 | 2/2003 | |
| DE | 102 11 549 B9 | 10/2003 | |
| EP | 0 159 117 B1 | 10/1985 | |
| EP | 0 159 568 B1 | 10/1985 | |
| EP | 0 173 231 A2 | 3/1986 | |
| EP | 1 136 513 B1 | 9/2001 | |
| JP | 59-009271 | 1/1984 | |
| JP | 4-11081 A | 1/1992 | |
| WO | WO 00/29663 A2 | 5/2000 | |
| WO | WO 03/078725 A1 | 9/2003 | |
| WO | WO 03078725 A1 * | 9/2003 | .......... D06M 15/564 |
| WO | WO 03/085015 A2 | 10/2003 | |
| WO | WO 03085015 A2 * | 10/2003 | |

OTHER PUBLICATIONS

Falbe et al., "Römpp Lexikon Chemie" 10 edition, vol. 2, pp. 1149-1150.
Notification Concerning Transmittal of International Preliminary Report on Patentability (Forms PCT/IB/338 and PCT/IB/373) and the Written Opinion of the International Searching Authority (Form PCT/ISA/237) issued in corresponding International Application No. PCT/EP2008/003478 dated Dec. 17, 2009.
International Search Report (PCT/ISA/210) dated Aug. 12, 2008.
Written Opinion _PCT/ISA/237) dated Aug. 12, 2008.

* cited by examiner

*Primary Examiner* — Kuo-Liang Peng
(74) *Attorney, Agent, or Firm* — Buchanan Ingersoll & Rooney PC

(57) ABSTRACT

The present invention relates to fluorocarbon polymer-free preparations (Z) based on water and/or organic solvents and their use as a finish on flat materials, containing
(1) 10-90% of a reaction product (S) prepared by reacting a component (A) with a partially blocked or non-blocked di-, tri- or polyisocyanate (IC) and
(2) 10-90% of a $C_8$-$C_{28}$-alkyl groups containing organopolysiloxane,
(3) 0-45% of a blocked or non-blocked di-, tri- or polyisocyanate, and
(4) if appropriate customary emulsifiers.
When used as a finish on flat materials, the preparations endow the treated flat materials with durable hydrophobic properties.

13 Claims, No Drawings

FLUOROCARBON POLYMER-FREE PREPARATIONS BASED ON WATER AND/OR ORGANIC SOLVENTS AND THE USE THEREOF AS A FINISH ON FLAT MATERIALS

This invention relates to preparations based on water and/or organic solvents and their use as a finish on flat materials.

It is known that flat materials are finished using waterborne or solvent-borne preparations of silicone oils, paraffins, fluorocarbon (FC) polymers and other additives that endow the finished flat materials with particular hydrophobic effects in order that the flat material may in use be able to meet the challenge of exposure to rain, splashed water or moisture from other sources.

While the production of water-repelling effects using products based on paraffins and silicones merely engenders a hydrophobicization of the textile fiber, fluorocarbon polymers lead additionally to soil and oil repellency. Fluorocarbon finishes are of interest for a large number of articles. They are used not only in the apparel and home textiles sector, but also in the industrial textiles sector.

Fluorocarbon finish products are typically based on polyurethanes or polyacrylates that contain perfluoroalkyl groups of different chain lengths. The preferably aqueous products are usually applied via the exhaust and pad-mangle process by spraying, foaming or nip padding, frequently in combination with other additives. These can be, for instance, heat-curing resins based on methylol compounds, which confer dimensional stability, wash fastness and stiffness. Extenders are also used. Extenders are typically fatty acid-modified melamine resins, mixtures of wax and zirconium salts or blocked polyisocyanates. The latter are frequently used to improve the water- and oil-repellent effects of the fluorocarbon finish and to increase the durability to washing.

The altogether good overall-effect level of FC polymers notwithstanding, it must be mentioned that, after washing operations, both the hydrophobic and the oleophobic effect is greatly reduced by the deorientation of the active FC residues on the polymer molecules, unless reorientation can take place through thermal treatment. Consequently, thus treated flat materials are in need of a post-wash heat treatment to revitalize the desired effects. For instance, ironing or at least tumble drying at >80° C. is a prerequisite for good phobic properties.

Organopolysiloxanes are also frequently used in combination with FC polymers. EP 0173231 A2 describes organopolysiloxanes having Si-attached hydrogen and Si—C-attached epoxy groups, their preparation and the use of these organopolysiloxanes together with FC polymers for hydro- and oleophobicization of fibers. DE 10139126 A1 describes similar compositions, consisting of polysiloxane, fluoropolymers and extenders.

JP 599271 describes products wherein reactive reaction products of fatty acid amides with polyisocyanates are used in combination with FC polymers.

One disadvantage with preparations based on FC polymer is the relatively high price, which is due to the many stages of synthesis, some of which are energy-intensive. Moreover, recent studies have detected the presence, in low concentrations, of by-products whose ecotoxicological properties have not as yet been fully investigated, so that adverse sensitization of the public to the entire group of FC polymers cannot be ruled out.

In addition to FC-containing systems, there are FC-free products whereby it is possible to achieve hydrophobic effects but not oleophobic effects. Aqueous emulsions of paraffins, metal soaps and also silicic acid salts of polyvalent metals are used to render the textile surface impermeable to rain or splashed water. Such preparations are also used for treating paper in order that its hydrophobic properties may be improved. German Auslegeschrift DE-AS 1001965 discloses using reaction products of basic metal salts of comparatively high molecular weight fatty acids or resin acids and low molecular weight di- or polyisocyanates for dry hydrophobicization of textiles.

The stability of the finish to repeated washing is an important issue as well as good initial hydrophobicity. Therefore, preparations designed to improve an inadequate stability to washing operations were developed very early. DE-B 1017 133 describes hydrophobicizing agents obtainable by mixing a condensation product of hexamethylolmelamine hexamethyl ether, stearic acid, stearic acid diglyceride and triethanol-amine with paraffin. The flaky or lumpy products thus obtained are brought before use into an emulsion form which can be applied from aqueous liquors by melting with hot water or steam and adding acetic acid.

However, the flat materials and fibrous materials endowed therewith have been observed to suffer a distinct harshening in their hand characteristics due to the relatively high add-on, the chemical character of the preparation and especially due to the crosslinking of the fatty acid-modified methyloltriazine compound with itself and with the functional groups of natural-based substrates.

Processes for impregnating textiles by applying crosslinkable organopolysiloxanes are well known. Crosslinking can be effected by condensing Si—H— and Si—OH-functional organopolysiloxanes with the aid of a catalyst as described in U.S. Pat. No. 4,098,701 for example. Crosslinking is similarly possible by addition of Si—H-functional organopolysiloxanes onto SiC-attached olefinic residues (cf. for example U.S. Pat. No. 4,154,714 and DE 3332997 A1). Owing to the reactive character of the organopolysiloxanes, it is difficult to produce storage-stable preparations. Frequently, the components can only be mixed directly before use, and this makes handling inconvenient in commercial practice.

WO 00/29663 A2 describes preparations for a durable fiber finish which contain reaction products of polyisocyanate-functional compounds with silicone-free and/or silicone-containing softeners and, as exemplified, preferably have a hydrophilicizing residues.

JP 04/011081 A describes a treatment composition for improving the water absorption of textiles. This treatment composition is prepared from an amino-functional organopolysiloxane, a hydrophilic polyether isocyanate and an epoxy-functional organopolysiloxane.

DE 2038705 B describes a method of producing fibrous structures having elastic hand by treatment with organopolysiloxane- and polyisocyanate-containing solutions and subsequent heating.

DE 19744612 A1 describes emulsions of organosilicon compounds for hydrophobicization of mineral and building materials and building coatings and wood. The aqueous emulsions contain alkoxysilanes modified with long-chain hydrocarbon chains. Use on textiles is not mentioned.

DE 10211549 B9 discloses preparations consisting of a synthetic or natural wax component, a highly branched polyurethane and optionally a blocked polyisocyanate. The waxes may comprise, for example, beeswax, carnauba wax, polyethylene wax or Fischer-Tropsch wax. However, linear paraffin waxes are particularly preferred.

These systems do provide very good water-repellent effects, but the amounts which have to be used are relatively high. As a consequence, the breathability of the finished textile is reduced. As in the case of the textiles treated with FC-containing preparations, washing has to be followed by a thermal treatment, for example in a tumble dryer or by ironing, to restore the original performance level.

The present invention therefore has for its object to produce a preparation which at low use levels endows flat materials with optimal hydrophobic effects without reducing the breathability of the finished textile. The preparation should further offer commercial and ecological advantages over the finish with FC polymers which represents the prior art. In addition, the textiles finished with the preparation should have a high performance level after washing even without a thermal treatment.

It has now been found that, surprisingly, this object is achieved by the use of a preparation which contains a hydrophobic reaction product (S) (component (1)), a $C_8$-$C_{28}$-alkyl groups containing organopolysiloxane (component (2)), if appropriate a polyisocyanate blocked by a protecting group (component (3)) and also, in the case of aqueous preparations, essential emulsifiers (component (4)). The preparations thus obtained provide superior hydrophobic properties coupled with low use levels, while the breathability of the textile finished therewith is preserved. Furthermore, the effect level is very good even after washing without thermal treatment.

According to a first aspect of the present invention there are provided fluorocarbon polymer-free preparations (Z) based on water and/or organic solvents, characterized by the inclusion of the following individual components:

(1) 10-90% of a hydrophobic reaction product (S) obtainable by reacting a component (A) of $$R^4-\underset{\underset{R^3}{|}}{\overset{\overset{R^1}{|}}{C}}-R^2 \quad \text{and/or of} \qquad \text{formula (I)}$$

$$B^1-N-\left[Q-N\right]_n-B^3 \qquad \text{formula (II)}$$
(with $B^2$ and $B^4$ substituents on the nitrogens)

where $R^1$ is a hydrophobic residue of the connotation —X—Y—Z or —Z, where

X is —$(CH_2)_{n''}$—,
Y is —O—C(=O)— or —O—C(=O)—NH—,
Z is —$(CH_2)_m$—$CH_3$, $R^2$ is a residue of the composition —$(CH_2)_n$—$(OCH_2CH_2)_{n'}$—$(OCH_2CH)_{n'''}$—OH
with $CH_3$ branch $R^3$ is a hydrophobic residue of the connotation —X—Y—Z, —Z or —Y—Z, with the proviso that in the case of the —Y—Z connotation n" always replaces n in the $R^2$ residue, $R^4$ is a residue of the connotation —X—Y—Z or —$(CH_2)_n$H, $B^1$ is a hydrophobic residue of the connotation —V—W—Z or —Z, where —$CH_2CH$— with $CH_3$ branch V is —$(CH_2)_{n''}$— or

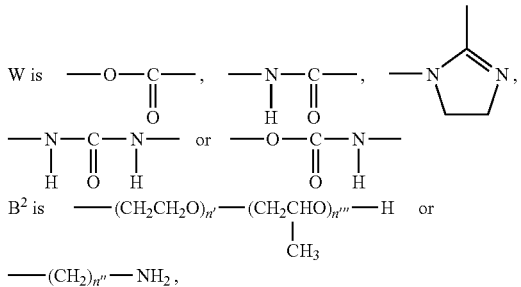

W is —O—C(=O)—, —N(H)—C(=O)—, imidazoline, —N(H)—C(=O)—N(H)— or —O—C(=O)—N(H)—

$B^2$ is —$(CH_2CH_2O)_{n'}$—$(CH_2CHO)_{n'''}$—H or —$(CH_2)_{n''}$—$NH_2$,
(with $CH_3$ branch)

$B^3$ is a hydrophobic residue of the connotation —V—W—Z, —Z or

—C(=O)—Z, $B^4$ is —V—W—Z or

—C(=O)—Z, and

Q is —$(CH_2)_{n''}$—, n, n', n", n''' and m are independently integers of the connotation n=0-2,
n'=0-4,
n"=1-4,
n'''=0-4 and
m=12-26, preferably 14-22, with a partially blocked or non-blocked di-, tri- or polyisocyanate (IC), wherein the fraction of free NCO groups is between 1.8 and 10 per mole and the ratio of free NCO groups to reactive groups in the compounds of formulae (I) and/or (II) is in the range from 1:1 to 1:1.3, (2) 10-90% of a $C_8$-$C_{20}$-alkyl groups containing organopolysiloxane constructed of structural units of formulae (IIIa, IIIb, IIIc, IV),

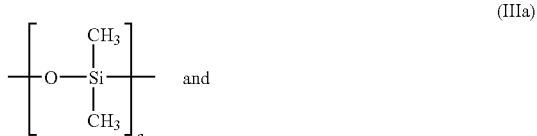
(IIIa)

(IIIb)

-continued

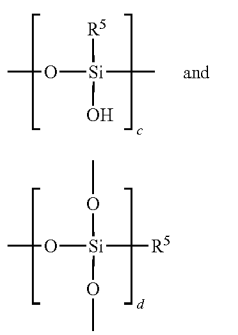

and end groups of formulae (Va, Vb, Vc)

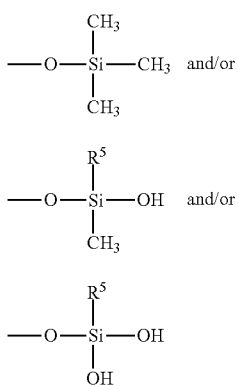

where $R^5$ in formulae (IIIb), (IIIc), (IV), (Vb) and (Vc) are each independently a linear or branched $C_8$-$C_{28}$-alkyl residue, preferably a linear or branched $C_{14}$-$C_{20}$-alkyl residue and more preferably a linear $C_{18}$-$C_{18}$-alkyl residue,
or a residue of the connotation

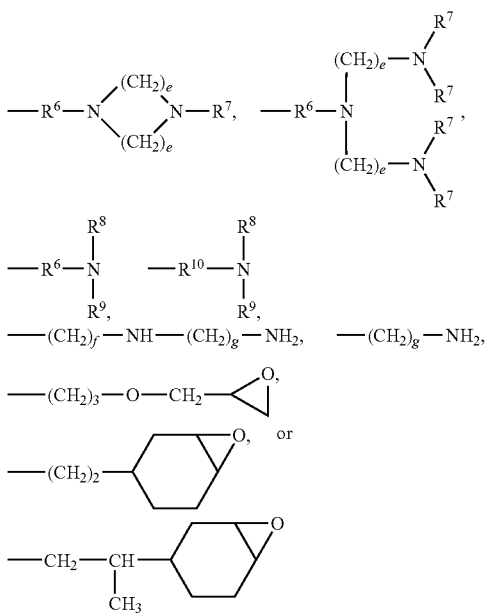

where $R^6$ is a residue of the connotation

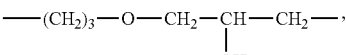
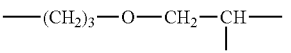
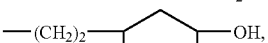
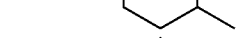
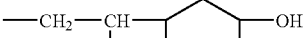

$R^7$ is a linear or branched $C_1$-$C_4$-alkyl residue,
$R^8$ and $R^9$ are identical or different, linear or branched $C_1$-$C_{18}$-alkyl residues, preferably linear $C_8$-$C_{18}$-alkyl residues and more preferably linear $C_{14}$-$C_{18}$-alkyl residues,
$R^{10}$ is a residue of the connotation
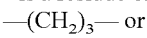
or
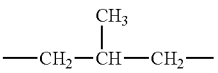

a=an integer from 0-700, preferably 0-350 and more preferably 0-175,
b=an integer from 0-900, preferably 0-450 and more preferably 0-225,
c=an integer from 0-200, preferably 0-100 and more preferably 0-50,
d=an integer from 0-100, preferably 0-50 and more preferably 0-25,
where a+b+c+d=10-1000, preferably 20-750 and more preferably 30-500,
b+c is ≥10, preferably ≥20 and more preferably ≥30,
e=the integer 2 or 3,
f=the integer 2 or 3,
g=the integer 2 or 3,
with the proviso that the total nitrogen content of the organopolysiloxane is 0.15-1.00, preferably 0.20-0.80 and more preferably 0.25-0.50 weight percent, the epoxy equivalent of the organopolysiloxane is 1000-25 000 g/eq, preferably 2000-15 000 g/eq and more preferably 5000-12 000 g/eq and the content of $C_8$-$C_{28}$-alkyl residues in the organopolysiloxane is 25-86, preferably 40-80 and more preferably 50-75 weight percent,
(3) 0-45% of a blocked or non-blocked di-, tri- or polyisocyanate, and
(4) if appropriate customary emulsifiers.
All percentages relating to preparations according to the present invention are based on the overall composition of the active substances in the preparation according to the present invention and are by weight. Preferred ranges are 20-80% and more preferably 25-65% for component (1) and 20-80% but especially 30-70% for component (2). When component (3) is added, its concentration is preferably in the range of 1-40% and especially in the range of 5-35%. The preferred concentration of component (4) is in the range of 4-25% and more preferably in the range of 7-15%, based on the sum total of the active substance in the components (1), (2) and (3) used.

Component (1) consists of a hydrophobic reaction product (S) obtainable by reacting a component (A) as defined in the claims with a di-, tri- or polyisocyanate (IC) as defined in the claims. The component (A) compounds of the formula (I) which are used in this component (1) consist of reaction products of polyhydroxy alcohols (a1) with carboxylic acids (b1) or with alkyl isocyanates (b2). Preferred examples of polyhydroxy alcohols (a1) are glycerol, trimethylolethane, trimethylolpropane, 1,2,4-butanetriol, pentaerythritol or sugars, such as glucose for example. Particular preference thereamong is given to glycerol, trimethylolethane, trimethylolpropane, 1,2,4-butanetriol and pentaerythritol.

The component (A) compounds of the formula (II) which are used in component (1) consist of reaction products of alkanolamines (a2) and/or alkylamines (a3) with carboxylic acids (b1) or with alkyl isocyanates (b2). Examples of alkanolamines (a2) are 2-amino-2,3-propanediol, 2-amino-2-methyl-1,3-propanediol, diethanolamine, dipropanolamine, diisopropanolamine, ethanolpropanolamine, triethanolamine, triisopropanolamine, N,N,N',N'-tetrakis(2-hydroxypropyl)ethylene-diamine, aminoethylethanolamine, aminopropylethanol-amine, alkyltris(hydroxyethyl) propylenediamine and alkyldihydroxyethylamine having preferably 12-24 carbon atoms in the alkyl moiety, and also ethoxylation products thereof. Of these, diethanolamine, diisopropanolamine, triethanolamine, triisopropanolamine, aminoethylethanolamine and aminopropylethanol-amine are particularly preferred.

Examples of alkylamines (a3) are bis(aminoethyl)amine, bis(aminopropyl)amine and their polymeric homologs, aminoethylaminepropylamine, bis(aminopropyl)ethylene-diamine, tris(aminoethyl)amine, tris(aminopropyl)amine, trisaminononane, aminopropylstearylamine and amino-propylbisstearylamine. Of these, his(aminoethyl)amine, bis(aminopropyl)amine, aminoethylaminopropylamine, bis(aminopropyl)ethylenediamine and aminopropylstearylamine are particularly preferred.

In lieu of component (A) prepared using the polyhydroxy alcohols (a1) or the alkanolamines (a2) or the alkylamines (a3) and also the carboxylic acids (b1) of the alkyl isocyanates (b2), the partially blocked or non-blocked di-, tri- or polyisocyanates (IC) can also be reacted with components having an active hydrogen atom and two hydrophobic moieties, such as for example, guerbet alcohols, bis(dodecyl)amine and preferably bis(octadecyl)amine.

Component (A) may further be prepared as described above using mixtures of the alcohols (a1) mentioned with the alkanolamines (a2) and with the alkylamines (a3).

The carboxylic acids (b1) used for preparing component (A) of the formula (I) and (II) can be saturated, linear or branched having 9 to 31 carbon atoms, preferably having 11-23 carbon atoms in the alkyl moiety. Examples of the saturated linear carboxylic acids used in formulae (I) and (II) are capric acid, undecanoic acid, lauric acid, myristic acid, palmitic acid, stearic acid, arachidic acid and behenic acid. Of these, lauric acid, palmitic acid, stearic acid and behenic acid are particularly preferred.

The alkyl isocyanates used for preparing component (A) of the formula (I) and (II) are preferably linear and have 9-31 and especially 12-22 carbon atoms in the alkyl moiety, an example being stearyl isocyanate.

The partially blocked or non-blocked di-, tri- or polyisocyanate (IC) can also be reacted using mixtures of two compounds of the formulae (I) and (II).

If compounds of the formulae (I) and (II) are commercially available, they can be used directly for the reaction mentioned; there is therefore no need to make them separately.

The above-elucidated component (A) is reacted with the di-, tri- or polyisocyanates (IC) defined in the claims to form a product (S). Examples of di-, tri- or polyisocyanates (IC) used for conversion into partially blocked or non-blocked isocyanates are described in paras 0032 to 0037 inclusive of on page 3 of DE-A-100 17 651.

Particularly preferred di-, tri- or polyisocyanates (IC) are for example 2,4-tolylene diisocyanate, 2,4'-diphenylmethane diisocyanate, 4-methylcyclohexane 1,3-diisocyanate, 4,4'-diphenylmethane diisocyanate, the mixtures of monomeric diphenylmethane diisocyanates and higher-chain homologues of diphenylmethane diisocyanates (polymeric MDI), tetramethylene diisocyanate, tetramethylene diisocyanate trimers, hexamethylene diisocyanate, hexamethylene diisocyanate trimers, isophorone diisocyanate, isophorone diisocyanate trimers, 2,2,4- or 2,4,4-trimethyl-1,6-hexamethylene diisocyanate and dimer diisocyanate. Dimer diisocyanate is available from Cognis Corp., 300 Brookside Avenue, Ambler, Pa. 19002, USA, under the designation of DDI 1410.

Cyclized oligo- or polyisocyanates can be prepared by known methods of cyclization as per W. Siefken (Liebigs Annalen der Chemie 562, Volume 1949, pages 75-136), for which open-chain or cyclic oligo- or polyisocyanates can be employed. Such compounds can be prepared from the di-, tri- and polyisocyanates mentioned by linking through urethane, allophanate, urea, biuret, uretdione, amide, isocyanurate, carbodiimide, uretoneimine, oxadiazinetrione or imineoxadiazinedione structures. Preference is given to using hexamethylene diisocyanate trimers, diphenylmethane diisocyanate trimers and urethanes from 2,4-tolylene diisocyanate which still have free NCO groups.

It is also possible to react some of the isocyanate groups with polyalkoxymonoalkyl ethers using appropriate catalyst systems for assistance to form urethanes in order that the emulsifiability of component (1) in water may be improved. Polyethylene glycol monomethyl ethers having 4-20 ethylene oxide units, optionally with an additional 2-6 propylene oxide units, may be used. Useful catalysts include the well-known systems based on tertiary amines and/or organotin compounds, for example dibutyltin dilaurate, dioctyltin dilaurate or dioctyltin diacetate.

As an alternative to the isocyanates modified with polyalkoxymonoalkyl ethers it is possible to use tertiary alkanolamines as additives in order that the cationic charge of the reaction products (S) and hence the self-emulsifying properties may be improved without impairing the overall properties. Dimethylaminoethanol is particularly suitable here.

When partially blocked di-, tri- or polyisocyanates (IC) are used for the reaction to form component (1), these may be partially blocked with the customary and known blocking agents, as described for example in para 0042 of DE-A-100 17 651. Preference is given to using sodium bisulfite or methyl ethyl ketoxime, but especially 3,5-dimethylpyrazole to effect partial blocking.

Partial blocking is effected by reacting the di-, tri- or polyisocyanates (IC) to be blocked with the blocking agent in the melt or in a substantially isocyanate-inert organic solvent (LM), preferably under a protective gas atmosphere and in the presence of a suitable catalyst, as described for example in European patent specification EP 0 159 117 B1 or German patent specification DE 44 41 418 A1. The ratio of the free NCO groups of the di-, tri- or polyisocyanates (IC) to be blocked to the reactive groups of the blocking agent is preferably in a stoichiometric excess up to 2:1 and preferably up to 3:1.

As suitable, inert organic solvents (LM) there are preferably anhydrous esters, for example ethyl acetate, n-propyl acetate, i-propyl acetate, n-butyl acetate, i-butyl acetate or amyl acetate.

Component (2) comprises novel $C_8$-$C_{18}$-alkyl groups containing organopolysiloxanes not described in the prior art. A novel aspect in connection with the present invention therefore consists in these compounds which are provided for the first time. This component is prepared via methods which are known to a person skilled in the art. Various routes are possible for the synthesis. The first route involves polymethylhydro-siloxanes of formula (VI) having lateral SiH groups having a chain length of m=10-1000 being hydro-silylated as described in EP 0159568 B1 (Example 1) with linear or branched α-olefins and unsaturated glycidyl ethers to obtain an epoxy- and alkyl-modified organopolysiloxane:

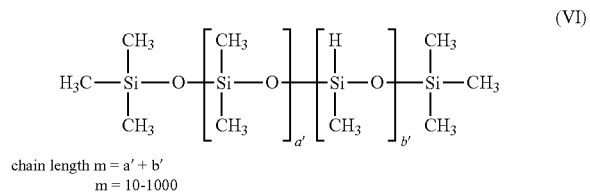

The number (b) of structural units of claim formula (IIIb) in the organopolysiloxane according to the present invention is determined in this synthesis step by the number (b') of SiH groups in the polymethylhydrosiloxane. The content of alkyl groups, epoxy groups and amino groups is thus also defined, indirectly. The polymethylhydrosiloxanes used are obtainable by a trifluoromethanesulfonic acid-catalyzed equilibration reaction similarly to U.S. Pat. No. 5,578,692 (Example 1).

The hydrosilylation is carried out at temperatures of 120-190° C. under Pt catalysis, and the reaction is generally conducted by initially charging the unsaturated compounds and adding the polymethylhydro-siloxane dropwise to obtain a compound of formula (VII):

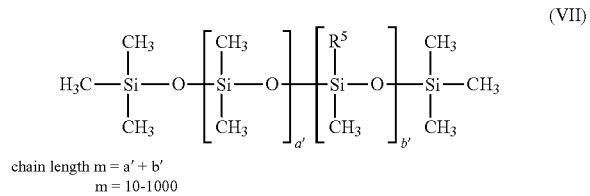

$R^5$=linear or branched $C_8$-$C_{28}$-alkyl,

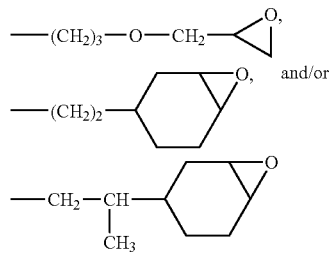

The Pt catalyst used is preferably hexachloroplatinic acid or 1,3-divinyl-1,1,3,3-tetramethyldisiloxane-platinum(0), while the amount used is 5-40 ppm of Pt based on the entire reaction batch.

The linear or branched α-olefins used comprise, for example, 2-methyl-1-heptene, 1-octene, 1-isooctene, 1-nonene, 1-isononene, 1-decene, 1-isodecene, 1-undecene, 1-isoundecene, 1-dodecene, 1-isododecene, 1-tridecene, 1-isotridecene, 1-tetradecene, 1-isotetradecene, 1-pentadecene, 1-isopentadecene, 1-hexadecene, 1-isohexadecene, 1-octadecene, 1-isooctadecene, 1-nona-decene, 1-isononadecene, 1-eicosene and α-olefin fractions comprising $C_{22}$-$C_{28}$. The $C_{14}$-$C_{20}$ α-olefins are preferred and 1-octadecene and 1-hexadecene are particularly preferred.

Examples of unsaturated glycidyl ethers are allyl glycidyl ether, (+)- or (−)-limonene oxide, or 4-vinyl-1-cyclohexene-1,2-epoxide, of which allyl glycidyl ether is particularly preferred.

In the next synthesis step, the epoxy groups can be partly reacted with amines, by ring opening similarly to DOS 1493384 (Example 1), to form the $C_8$-$C_{28}$-alkyl groups containing organopolysiloxanes of the present invention. The amines used are particularly preferably bis[3-(dimethylamino)propyl]amine and N-methylpiperazine.

Care must be taken to ensure in the entire synthesis sequence that the epoxy equivalent in the organopolysiloxane of the present invention is 1000-25 000 g/eq, preferably 2000-15 000 g/eq and more preferably 5000-12 000 g/eq. Furthermore, the content of $C_8$-$C_{28}$-alkyl residues in the organopolysiloxane is 25-86, preferably 40-80 and more preferably 50-75 weight percent. The nitrogen content is 0.15-1.00, preferably 0.20-0.8 and more preferably 0.25-0.50. The individual contents in the organopolysiloxane are mainly set via three factors:

1. via the number (b') of SiH groups in the polymethylhydrosiloxane of formula (VI),
2. via the ratio of α-olefin to unsaturated glycidyl ethers in the hydrosilylation to form compounds of formula (VII),
3. via the number of epoxy groups which are reacted with the amine.

A further route to preparing the organopolysiloxanes of the present invention consists in a synthesis whereby, in a first step, a polymethylhydrosiloxane having lateral SiH groups having a chain length of 10-1000 Si units is reacted as in U.S. Pat. No. 5,493,041 for example (Example 4) to prepare an alkyl-modified organopolysiloxane which is subsequently equilibrated under base catalysis with epoxysilanes and with aminosilanes similarly to EP 1136513 B1 (Example 1).

The equilibration reaction is preferably conducted under catalysis with tetramethylammonium hydroxide, potassium hydroxide or sodium hydroxide in the presence of small amounts of water, so that first the alkoxysilanes are hydrolyzed to form free SiOH groups. The amount of water is chosen such that about 30 mol % of the alkoxysilane groups hydrolyze. The alcohol formed in the course of the hydrolysis is distilled off and in the process the temperature is gradually raised to about 110° C. When epoxysilane and aminosilane are used at the same time, care must be taken to ensure that this temperature does not rise above 110° C., since otherwise the amino compound will add onto the epoxy group by ring opening. This leads to strongly crosslinked organopolysiloxanes, which are difficult to emulsify. The reaction is further policed such that a certain degree of crosslinking of the SiOH groups takes place via a condensation reaction which eliminates water. The degree of crosslinking should be controlled such that the viscosity of the product permits stirring. The addition of a solvent such as methanol, ethanol or isopropanol for example may possibly improve the homogeneity of the reaction mixture. The solvent is distilled off after the reaction has ended.

Examples of useful epoxysilanes include 3-glycidyloxypropyltrimethoxysilane, 3-glycidyloxypropyldimethoxymethylsilane, glycidyloxypropyltriethoxysilane or 3-glycidyloxypropyldiethoxymethylsilane, while useful aminosilanes include for example N-(2-aminoethyl)-3-(aminopropyl)methyldimethoxysilane, 3-aminopropyl-trimethoxysilane, N-(2-aminoethyl)-N'-[3-(trimethoxy-silyl) propyl]ethylenediamine, N-(2-aminoethyl)-3-(aminopropyl) methyl-diethoxysilane or 3-aminopropyltriethoxysilane.

The claimed organopolysiloxanes used as component (2) are novel organopolysiloxanes not described in the prior art.

The inclusion of component (3) in the preparations (Z) of the present invention is optional. Compounds of this type are referred to as boosters in that they boost the water repellency of treated flat materials. At the same time, the polyfunctionality of the polyisocyanate brings about a cross-linkage with the —OH, —COON or —NH$_2$ groups always present in most substrates and with unconverted functions of component (1), and this distinctly improves the durability to washing operations and enhances the resistance to abrasion.

Component (3) can be used in non-blocked form as well as in blocked form. The non-blocked forms of component (3) are predominantly employed in applications from apolar media, since this avoids any unwanted, premature reaction of the free NCO groups with the reactive active hydrogen atoms of the application medium.

The non-blocked di-, tri- or polyisocyanates suitable for preparing component (3) and also the cyclized oligo- and polyisocyanates were described above in relation to the preparation of reaction product (S) in component (1).

When component (3) is to be applied to flat materials from application media which bear active hydrogen atoms, it is frequently necessary to protect the reactive NCO groups by blocking them with suitable blocking agents. In these cases, component (3) is prepared by processes wherein the complete blocking of the free NCO groups of di-, tri- or polyisocyanates is carried out with a blocking agent and in the presence or absence of an organic solvent. To achieve complete blocking, it is customary to employ a small stoichiometric excess of blocking agent. When products for aqueous applications are to be prepared, the blocked di-, tri- or polyisocyanates, which may be dissolved in an organic solvent, have to be converted into emulsion form through use of suitable emulsifiers (=component (4)).

Examples of suitable customary and known blocking agents are known from para 0042 of DE-A-100 17 651 and are described above in the description of the preparation of reaction product (S) in component (1).

There is a particular embodiment where non-blocked di-, tri- or polyisocyanates are used as boosters, but the self-emulsifiability in water of these non-blocked di-, tri- or polyisocyanates is enhanced by partial reaction of the isocyanate groups with polyalkoxymonoalkyl ethers through assistance of appropriate catalyst systems to form urethanes. The attachment of hydrophilic side chains to the di-, tri- or polyisocyanates serves to favorably modify the HLB value of the resultant urethane such that the inherently water-insoluble compound acquires self-emulsifying properties. A certain selection of type and amount is advantageous with regard to the hydrophilic side chains. Preference is given to using between 4 and 20 ethylene oxide moieties, optionally together with 2-6 propylene oxide moieties, and these can also be present in blocks within the alkoxy chain. In the case of such mixedly alkoxylated side chains, however, the ethylene oxide fraction will always outweigh the propylene oxide fraction. Useful catalysts for the urethane synthesis include the well-known systems based on tertiary amines and/or organotin compounds, for example dibutyltin dilaurate, dioctyltin dilaurate or dioctyltin diacetate.

In use, the urethanes thus prepared spontaneously form fine emulsions in water which possess high stability to shearing forces and good compatibility with the other components of an application liquor. Owing to the reactivity of the remaining, unconverted NCO groups with water, these speciality forms have only limited pot lives of not more than 8 hours in the application liquor.

Component (3) is added especially in cases where the treated flat materials have to meet particularly high wash-stability requirements. It is then preferable to employ 5-25% of this compound, which can be used directly and without formulation auxiliaries when application is to take place from waterless solvent-borne media. For application from an aqueous medium, it is preferable to employ emulsions of component (3) which have a solids content of 15-35% and which are prepared by using emulsifiers (=component (4)) based on ethoxylated fatty amines, optionally in quaternary form, and if appropriate other emulsifying auxiliaries, for example solubilizers based on ethylene glycol, propylene glycol, dipropylene glycol, dipropylene glycol monomethyl ether, mono- or diethylene glycol monobutyl ether or N-methylpyrrolidone. Emulsification can be effected by means of high pressure homogenizing machines.

When the preparations (Z) of the present invention are aqueous based, the emulsifiers (=component (4)) are used. The emulsifiers (=component (4)) used for formulating components (1), (2) and if appropriate (3) of the preparations according to the present invention are known. Useful emulsifiers include for example ethoxylation products of fatty acids, fatty acid amides, fatty alcohols, fatty amines, the latter as such or in the form of their salts with low molecular weight organic acids or mineral acids and also quaternary ammonium compounds, for example cetylbenzyldimethylammonium chloride and preferably ethoxylated octadecylmethylammonium chloride. Such emulsifiers are described for example in "Römpp Lexikon Chemie" (10th edition, Volume 2, pages 1149 and 1150).

The customary use levels for the emulsifiers are preferably between 4% and 25% by weight, based on the sum total of the active substance of components (1), (2) and if appropriate (3).

The emulsions are prepared using the known methods of forming secondary emulsions. Typically the emulsifying temperature is above the melting range of the active substances of the employed components (1), (2) and if appropriate (3), and preferably it is between 50 and 80° C. To produce very finely divided and particularly stable emulsions, a coarsely divided pre-emulsion is frequently prepared first, the particles of which are subsequently comminuted to the necessary average particle size between 0.1 and 10 micrometers by means of high pressure homogenizers.

If desired, the inert organic solvents (LM) added as a reaction medium for preparing the components (2) and if appropriate (3), examples being ethyl acetate, n-propyl acetate, i-propyl acetate, n-butyl acetate, i-butyl acetate or amyl acetate, can be distillatively removed after emulsification in order that emissionable organic hydrocarbons may be avoided.

A further aspect of the invention is the use of the present invention's preparations of claim 1 as a finish on flat materials. Examples of textile flat materials include wovens, formed-loop knits and nonwovens composed of natural fibres, such as wool or cotton, or synthetic fibres, especially polyester, polyamide and regenerated fibres or blends thereof.

Textile flat materials are generally treated to add-ons of 0.5-3% by weight, preferably 0.5-2.5% by weight and more preferably 0.5-2.0% by weight of solids of the present invention's preparation based on the weight of the flat material to be treated. Typically, an aqueous liquor is forcedly applied by padding in the desired concentration at wet pick-ups of 40-100%, subsequent predrying at 80-110° C. and a following hot treatment at 130-170° C. for 1-5 minutes. The duration of the heat treatment is in each case dependent on the temperatures employed.

The well-known exhaust process is another possible form of application to textile flat materials.

When used on textile flat materials, the preparations of the present invention can also be combined with textile auxiliaries customary in the textile industry. To be emphasized here are agents which improve the unwrinkling properties, for example methylol compounds of dihydroxyethyleneurea or methylolmelamine ethers having different degrees of methylolation. Useful textile auxiliaries further include those which improve flame resistance or endow the sheetlike structure with a preferred hand. Fabric hand, however, can be steered in the desired direction through favorable combination of components (1) to (3) which is why in these cases there is no need to include further textile auxiliaries.

The flat materials can also consist of paper, which can be produced by the known papermaker's methods and from all basic materials customary in this field of application. The preparations of the present invention can be employed either as an addition to the pulp or by application to the surface of the machine-finished paper by coating systems utilizing roll, doctor or air knife coating processes and subsequent infrared, hot air or cylinder drying.

Flat materials composed of leather are likewise suitable for finishing with the preparations of the present invention. Application in the post-tannage finishing operations can take the form of existing processes or by spraying or drenching.

The treatment of other flat materials is likewise possible. For instance, mineral flat materials, examples being unglazed tiles, ceramic parts or else wall surfaces, can be endowed with excellent water repellency by drenching with the finishing liquor of the present invention.

Flat materials can be treated by various methods, for example through application of a liquor of the finish according to the present invention by spraying, nip padding, brush or sponge application, if appropriate even in foam form. The add-ons used for the preparation of the present invention in terms of solids are generally 0.5-3% by weight, preferably 0.5-2.5% by weight and more preferably 0.5-2.0% by weight, based on the weight of the flat material to be treated.

A further aspect of the invention is the use of the present invention's preparations according to claim 3, on textile substrates as an aftertreatment of washed textiles.

Many made-up articles are washed either in the home on household washing machines or on industrial washing machines. The latter applies particularly to the work wear of firefighters, the police, the military and other professions which frequently have to spend time outdoors and hence are exposed to the weather. The garments, typically finished to be oil, water and soil repellent, undergo a loss of these properties due to washing. These properties are therefore frequently refreshed and revitalized again through an aftertreatment with phobicizing agents. The preparations of the present invention are useful for this purpose.

The revitalizing treatment of industrially washed made-up articles takes place in a washing or spin dryer drum by pouring a liquor of the preparations according to the present invention on the moist spun garments and subsequent tumble drying. In the case of household washing machines, the finish can be applied in the course of the customary rinse cycle or by means of a dosing ball system.

A further aspect of the invention is the use of the preparations according to the present invention as a finish on flat materials from organic solvents by drenching or dipping.

Many garments are not washed, but are subjected to cleaning in organic solvents. As in the case with the aftertreatment of washed articles, the hydrophobic properties can be revitalized by refreshing with products based on the preparations of the present invention.

The revitalizing treatment of the made-up articles cleaned in organic solvents takes place in the cleaning drum of a dry cleaning machine by pouring or spraying a liquor of the preparations according to the present invention onto the damp spun cleaned articles and subsequent removal of the solvents in a tumble dryer at elevated temperatures. The chemical identity of the cleaning agent is immaterial here, i.e. the treatment can take place not only on state of the art machines in closed systems using perchloroethylene or on those which are suitable for treatment with solvents based on hydrocarbons, an example being Isopar J.

A further aspect of the invention is the use of the preparations according to the present invention as a finish on sheetlike structures from organic solvents by spraying.

Instead of a revitalizing treatment of textile flat materials after washing or cleaning operations by application of the present invention's preparations from continuous waterborne or solvent-borne liquors, the present invention's preparations can also be applied by means of various spraying methods in the consumer care sector. Offerings in this sector include phobicizing agents formulated in organic solvents and propellant gases from aerosol cans or through pumping mechanisms. In the shoe care sector in particular an appreciable improvement in water repellency and hence in wearing comfort can be achieved.

The present invention further provides textile substrates having a finish which were obtained in the use of the preparations of the present invention.

The examples which follow illustrate the invention. The finishes were applied to textile flat materials on an "RFA" LFV 350/2 laboratory pad-mangle from Benz (Switzerland) with subsequent drying and hot treatment on a TKF 15/M 350 laboratory stenter from Benz (Switzerland). Spray application was carried out in a closed fume hood through manual and one-sided application by means of a pump spray onto the taut flat material with subsequent drying at room temperature for 24 hours. The wet pick-up was determined by weighing out the finished test samples before and after application.

The hydrophobic effects were tested not directly after application, but only after conditioning of the substrates in a standard atmosphere for 24 hours in order that influences on these properties due to over-drying may be levelled out. Add-on levels and also the conditions for the hot treatment are recited in Tables 3a and 3b together with the phobic effects to be achieved.

The water repellency was tested on the textile flat materials not only by the spray test of AATCC Standard Test Method 22 but also by means of the significantly more discriminating Bundesmann test of German industrial standard DIN 53 888. The test as per AATCC Standard Test Method, 22 takes the form of spraying distilled water under controlled conditions onto the textile substrate to be tested and then visually rating the wetting pattern against pictures of an evaluation standard included in the test method. The numerical values reported are based on the appearance of the surface after spraying with water and have the following connotation:

100=No clinging of water droplets or wetting of the upper surface
90=Occasional clinging of water droplets or wetting of the upper surface
80=Wetting of the upper surface at water impact points
70=Partial wetting of total upper surface
50=Complete wetting of total upper surface
0=Complete wetting of total upper and lower surfaces (wet through).

In the significantly more discriminatory Bundesmann test of German industrial standard DIN 53 888 the textile substrate to be tested is exposed to the action of a defined artificial shower and the amount of water absorbed after a certain time is determined in percent and identified in Tables 3a and 3b as "water absorption". A further evaluation criterion is the water bead-off effect identified as "bead-off effect" in Tables 3a and 3b. This bead-off effect is rated by visual comparison of the beshowered test samples with the pictures recited in the DIN standard, on a 5-point scale, which is defined as follows:
5=Small droplets bead-off quickly
4=Larger drops form
3=props remain clinging at points on the measured sample
2=Measured sample partially surface wetted
1=Measured sample surface wetted or wet through over its entire area.

To test the durability of the finished flat materials to washing operations, the test samples were subjected to a 60° C. washing and drying procedure in accordance with EN ISO 6330:2000.

Water vapor permeability is measured similarly to ISO 11092 as water-vapor resistance ($R_{et}$ value). The following criteria can be used for a differentiating assessment of textiles:

$R_{et} \leq 6$ m² Pa/W very good
$R_{et} \leq 13$ m².Pa/W good
$R_{et} \leq 20$ m² Pa/W satisfactory
$R_{et} \geq 20$ m² Pa/W unsatisfactory Examples Relating to the Preparation of Component (1)
Component (A):
General Method of Making Components (A) of Formula (I) and/or (II)

The components indicated in Tables 1a and 1b (a1, a2 or a3) and (b1) are melted in the Tables 1a and 1b amounts in grams, in a suitably dimensioned three-neck flask equipped with distillation condenser, adjustable stirrer and internal thermometer under protective gas and with stirring. The mixture is then heated to the end temperature (T) indicated in Tables 1a and 1b and stirred further until water of reaction is no longer distilled off and the acid number (SZ) reported in Tables 1a and 1b is attained. If necessary, 0.1% of sulphuric acid can be added to the esterification reactions as a catalyst. No addition of catalyst is needed in the case of the amidation reactions. The resulting condensation product is poured out, cooled down and chipped.

Component (A):
Particular Method of Making Components (A) of Formula (I) and/or (II) Involving the Use of Alkyl Isocyanates (b2) and Further Processing to Form Reaction Products (S)

A suitably dimensioned three-neck flask equipped with reflux condenser, adjustable stirrer, internal thermometer and dripping funnel is charged with the Tables 1a and 1b components (a1) and (b2) in grams in isopropyl acetate (solvent (LM)). This is followed by the addition of 0.05% (based on the total amount of the components) of 1,4-diazabicyclo(2,2,2)octane as catalyst and stirring of the mixture at 80° C. until the NCO band in the IR spectrum had disappeared.

To prepare the reaction product (S), the mixture is subsequently admixed with the amounts in grams of component (IC) which are reported in Tables 1a and 1b and is further stirred at 80° C. until the NCO band in the IR spectrum has disappeared.

Reaction products (S) (=Component (1)):
General Method of Making Reaction Products (S) from a Component (A) and Partially Blocked or Non-Blocked di-, Tri- or Polyisocyanates (IC)

A suitably dimensioned three-neck flask equipped with reflux condenser, adjustable stirrer, internal thermometer and dripping funnel is charged with the Tables 1a and 1b components (A) and the components (IC) in the Tables 1a and 1b amounts in grams in isopropyl acetate solvent (LM). This is followed by the addition of 0.05% (based on the total amount of the components) of 1,4-diazabicyclo(2,2,2)octane catalyst and stirring of the mixture at 65° C. until the NCO band in the IR spectrum has disappeared.

Particular Method of making the Reaction Products (S) used in Emulsions (E) 3 and 9

Emulsions (E) 3 as per Table 1a are prepared using a reaction product (S) prepared by the Table 1a amount (in grams) of dimethylaminoethanol being added in the course of the reaction of component (A) with the isocyanate (IC).

Emulsions (E) 9 as per Table 1a are prepared using a reaction product (S) prepared by the Table 1a amount (in grams) of bisoctadecylamine being added in the course of the reaction of component (A) with the isocyanate (IC).

Emulsions (E):
General Method of Making Emulsions (E) from Component (1) or the Reaction Products (S) and Component (2)

Oily phase: A suitably dimensioned glass beaker is charged with the Tables 1a and 1b amounts (in grams) of reaction product (S), present in the aforementioned isopropyl acetate, and of component (2), and this initial charge is heated to 65-70° C. with stirring until a clear, homogeneous solution has formed. The reaction product (S) to be used may have to be melted at 65-70° C. before use in order that a homogeneous product may be obtained.

Aqueous phase: The Tables 1a and 1b amounts (in grams) of emulsifiers (Em) (=component (4)) are dissolved in the stated amount of water at 65° C. in a suitably dimensioned glass beaker.

The two phases are stirred together by a high speed stirrer to form a coarse pre-emulsion and subsequently homogenized at 65° C. on a high pressure homogenizing machine at 300-500 bar until an average particle size between 0.1 and 10 micrometers is reached. The solvent (LM) is subsequently removed by azeotropic distillation under reduced pressure on a rotary evaporator. If appropriate, the pH of the resulting emulsion is adjusted to 5-7 with 60% acetic acid, and the resultant white emulsion is filtered through a 20 micrometer filter and adjusted with water to a solids content of 25%.

The emulsions (E) 10-12 described in Table 1b contain a paraffin wax (not according to the invention) instead of component (2), and were prepared for comparison.

Examples Relating to the Preparation of Component (2)
Organopolysiloxane 1

71.99 g (0.28 mol) of n-octadecene and 2.5 g (0.02 mol) of allyl glycidyl ether are admixed with 0.2 g of a 2% hexachloroplatinic acid solution in methyl propyl ketone and heated to 120° C. under a nitrogen atmosphere. Then, 205 g (0.30 mol of SiH) of a methylhydropoly-siloxane having a chain length of m=50 and 30 Si—H groups (b'=30), prepared similarly to U.S. Pat. No. 5,578,692 (Example 1), are gradually added dropwise at 120° C. After the mixture has been stirred at 120° C. for 2 h, it is heated to 140° C. and admixed with 1.5 g (0.008 mol) of bis[3-(dimethylamino)propyl]amine. The mixture is stirred at 140° C. for 1 h to obtain, after cooling, 94.7 g of a light-gray wax which has a nitrogen content of 0.30%. The epoxy equivalent is 7958 g/eq and the content of $C_8$-$C_{28}$-alkyl residues in the organopolysiloxane is 65 weight percent. The wax is used to produce emulsions (E) 1, 2 and 3 in Table 1a.
Organopolysiloxane 2
130 g (0.580 mol) of n-hexadecene and 4.6 g (0.040 mol) of allyl glycidyl ether are admixed with 0.4 g of a 2% hexachloroplatinic acid solution in methyl propyl ketone and heated to 120° C. under a nitrogen atmosphere. Then, 53.9 g (0.62 mol of SiH) of a methylhydropoly-siloxane having a chain length of m=100 and 75 Si—H groups (b'=50), prepared similarly to U.S. Pat. No. 5,578,692 (Example 1), are gradually added dropwise at 120° C. After the mixture has been stirred at 120° C. for 2 h, it is heated to 140° C. and admixed with 2.0 g (0.02 mol) of bis[3-(dimethylamino)propyl]amine. The mixture is stirred at 140° C. for 1 h to obtain, after cooling, 190.9 g of a light-gray wax which has a nitrogen content of 0.29%. The epoxy equivalent is 9380 g/eq and the content of $C_8$-$C_{28}$-alkyl residues in the organopolysiloxane is 68 weight percent. The wax is used to produce emulsions (E) 4, 5 and 6 in Table 1a.
Organopolysiloxane 3
74.1 g (0.33 mol) of n-hexadecene are admixed with 0.3 g of a 2% hexachloroplatinic acid solution in methyl propyl ketone and heated to 120° C. under a nitrogen atmosphere. Then, 60.0 g (0.33 mol of SiH) of a methylhydropolysiloxane having a chain length of m=500 and 190 Si—H groups (b'=190), prepared similarly to U.S. Pat. No. 5,578,692 (Example 1), are gradually added dropwise at 120° C. After the mixture has been stirred at 120° C. for 2 h, it is cooled down to 60° C. and admixed with 9.0 g (0.050 mol) of 3-aminopropyltrimethoxysilane and with a solution of 0.15 g of KOH in 1.59 g of water. The mixture is stirred at 60° C. for 30 min and then heated to 110° C. Then, 3.0 g (0.136 mol) of glycidyloxypropyldimethoxymethylsilane are added and the mixture is stirred at 110° C. for 1 h.

The mixture is cooled down to give 148.1 g of a light-gray wax which has a nitrogen content of 0.47%. The epoxy equivalent is 10 863 g/eq and the content of $C_8$-$C_{28}$-alkyl residues in the organopolysiloxane is 50 weight percent. The wax is used to produce emulsions (E) 7, 8 and 9 in Table 1a.
Production of Inventive Preparations (Z)

Table 2 emulsions (E), comprising components (1), (2) and (4), are mixed if appropriate with component (3) and if appropriate water in the stated weight ratios to obtain the preparations (Z) reported in Tables 2a and 2b.

FINISHING EXAMPLES

Use of Water-Borne Preparations (Z) on Textile Flat Materials:

Finishing conditions and test results are recited in Tables 3a, 3b and 4.

Use of Solvent-Borne Preparations (Z) on Textile Flat Materials (not Recited in Tables 3a and 3b):

For this use, 5 g of the reaction product (S) recited in column 3 of Table 1a are dissolved with 5 g of the organopolysiloxane 3 in 190 g of isopropyl acetate. The solution is pump-sprayed from about 30 cm against the Table 3a and 3b cotton and polyester substrates until the surfaces are uniformly wetted. The fabrics are subsequently dried at room temperature for 24 hours. The treated cotton poplin and polyester test fabrics exhibit an AATCC Standard Test Method water repellency of 100.

TABLE 1a (inventive):
Preparation of component (1) and component (2) and also their emulsions (E)
Amounts reported in grams

| | | | Components | 1 | 2 | 3 | 4 | 5 | 6 | 7 | 8 | 9 |
|---|---|---|---|---|---|---|---|---|---|---|---|---|
| Component (A) (=precursor from (a) and (b) to reaction product (S)) | (a) | (a1) | Glycerol | 92.1 | 92.1 | 92.1 | | | | | | |
| | | (a2) | Triethanolamine | | | | 149.0 | 149.0 | 149.0 | | | |
| | | (a3) | Bis(aminoethyl)amine | | | | | | | 103.0 | 103.0 | 103.0 |
| | (b) | (b1) | Lauric acid | | | | | | | 400.0 | | |
| | | | Palmitic acid | | 512.0 | 512.0 | | | | | | |
| | | | Stearic acid | | | | 568.0 | 568.0 | | | | |
| | | | Behenic acid | | | | | | | | 680.0 | 680.0 |
| | | (b2) | Stearyl isocyanate | 591.0 | | | | | | | 591.0 | |
| | | | End temperature (T) in ° C. | 90 | 160 | 160 | 165 | 165 | 160 | 165 | 90 | 160 |
| | | | Acid number (SZ) | | <5 | <5 | <10 | <10 | <5 | <5 | | <5 |
| Reaction product (S) (=comp. (1)) | | | Component (A) | 123.0 | 156.0 | 156.0 | 141.0 | 141.0 | 134.0 | 113.0 | 128.0 | 113.0 |
| | | | Bis(octadecyl)amine | | | | | | | | | 10.4 |
| | | | Dimethylaminoethanol | | | | 5.4 | | | | | |
| | | Isocyanate (IC) | 2,4-Tolylene diisocyanate/ trimethylol-propane urethane with 13.5 wt % NCO | 56.3 | | | 64.7 | | | 47.3 | | 41.0 |
| | | | Hexamethylene diisocyanate trimer with 21.7 wt % NCO | | 53.1 | 41.4 | | 40.1 | 50.5 | | 35.7 | |
| | | Solvent (LM) | Isopropyl acetate | 179 | 209 | 203 | 206 | 181 | 184 | 160 | 164 | 164 |
| Emulsion (E) comprising components (1), (2) and (4) | | Reaction product (S) | | 100.0 | 152.0 | 152.0 | 124.0 | 124.0 | 124.0 | 113.0 | 113.0 | 113.0 |
| | | Component (2) $C_8$-$C_{18}$-alkyl groups-containing organopolysiloxane | Organopolysiloxane 1 | 33.0 | | | 40.0 | | | 57.0 | | |
| | | | Organopolysiloxane 2 | | 76.0 | | | 40.0 | | | | 57.0 |
| | | | Organopolysiloxane 3 | | | 76.0 | | | 40.0 | | 57.0 | |
| | | Component (4) emulsifier (Em) | Ethoquad HT 25 | 0.25 | 0.53 | 0.53 | 0.31 | 0.31 | 0.31 | 0.40 | 0.40 | 0.40 |
| | | | Disponil A 1080 | 2.15 | 4.30 | 4.30 | 2.68 | 2.68 | 2.68 | 2.71 | 2.71 | 2.71 |
| | | | Arquad 2C75 | 1.86 | 3.96 | 3.96 | 2.77 | 2.77 | 2.77 | 2.86 | 2.86 | 2.86 |
| | | | Water | 261 | 456 | 456 | 306 | 306 | 306 | 341 | 341 | 341 |
| | | | Acetic acid 60% | 0.30 | 0.50 | 0.50 | 0.40 | 0.40 | 0.40 | 0.40 | 0.40 | 0.40 |

TABLE 1b (non-inventive):
Preparation of non-inventive emulsions (E) with paraffin waxes
Amounts reported in grams

| | | | Components | 10 | 11 | 12 |
|---|---|---|---|---|---|---|
| Component (A) (=precursor from (a) and (b) to reaction product (S)) | (a) | (a1) | Glycerol | 92.1 | | |
| | | (a2) | Triethanolamine | | 149.0 | |
| | | (a3) | Bis(aminoethyl)amine | | | 103.0 |
| | (b) | (b1) | Stearic acid | | 568.0 | |
| | | | Behenic acid | | | 680.0 |
| | | (b2) | Stearyl isocyanate | 591.0 | | |
| | End temperature (T) in °C. | | | 90 | 165 | 165 |
| | Acid number (SZ) | | | | <10 | <5 |
| Reaction product (S) (=comp. (1)) | Component (A) | | | 123.0 | 141.0 | 113.0 |
| | Isocyanate (IC) | | 2,4-Tolylene diisocyanate/trimethylol-propane urethane with 13.5 wt % NCO | 56.3 | | 47.3 |
| | | | Hexamethylene diisocyanate trimer with 21.7 wt % NCO | | 40.1 | |
| | Solvent (LM) | | Isopropyl acetate | 179 | 181 | 160 |
| Emulsion (E) comprising components (1), paraffin wax and component (4) | Reaction product (S) | | | 100.0 | 124.0 | 113.0 |
| | Paraffin wax | | Paraffin 60/62 | 33.0 | | 57.0 |
| | | | Paraffin 52/54 | | 40.0 | |
| | Component (4) emulsifier (Em) | | Ethoquad HT 25 | 0.25 | 0.31 | 0.40 |
| | | | Disponil A 1080 | 2.15 | 2.68 | 2.71 |
| | | | Arquad 2C75 | 1.86 | 2.77 | 2.86 |
| | Water | | | 261 | 306 | 341 |
| | Acetic acid 60% | | | 0.30 | 0.40 | 0.40 |

TABLE 2a

Blend ratios of inventive preparations (Z)

| Parts by weight of emulsion (E) comprising component (1), (2) and (4) | Parts by weight of component (3) RUCO-GUARD EPF 1660 | Parts by weight of water | Preparation (Z) |
|---|---|---|---|
| 90 of (E) 1 | — | 10 | 1 (inventive) |
| 90 of (E) 1 | 10 | — | 2 (inventive) |
| 90 of (E) 2 | — | 10 | 3 (inventive) |
| 90 of (E) 2 | 10 | — | 4 (inventive) |
| 90 of (E) 3 | — | 10 | 5 (inventive) |
| 90 of (E) 3 | 10 | — | 6 (inventive) |
| 90 of (E) 4 | — | 10 | 7 (inventive) |
| 90 of (E) 4 | 10 | — | 8 (inventive) |
| 90 of (E) 5 | — | 10 | 9 (inventive) |
| 90 of (E) 5 | 10 | — | 10 (inventive) |
| 90 of (E) 6 | — | 10 | 11 (inventive) |
| 90 of (E) 6 | 10 | — | 12 (inventive) |
| 90 of (E) 7 | — | 10 | 13 (inventive) |
| 90 of (E) 7 | 10 | — | 14 (inventive) |
| 90 of (E) 8 | — | 10 | 15 (inventive) |
| 90 of (E) 8 | 10 | — | 16 (inventive) |
| 90 of (E) 9 | — | 10 | 17 (inventive) |
| 90 of (E) 9 | 10 | — | 18 (inventive) |

TABLE 2b

Blend ratios of non-inventive preparations (Z)

| Parts by weight of emulsion (E) comprising component (1), paraffin wax and (4) | Parts by weight of component (3) RUCO-GUARD EPF 1660 | Parts by weight of water | Preparation (Z) |
|---|---|---|---|
| 90 of (E) 10 | — | 10 | 19 (non-inventive) |
| 90 of (E) 10 | 10 | — | 20 (non-inventive) |
| 90 of (E) 11 | — | 10 | 21 (non-inventive) |
| 90 of (E) 11 | 10 | — | 22 (non-inventive) |
| 90 of (E) 12 | — | 10 | 23 (non-inventive) |
| 90 of (E) 12 | 10 | — | 24 (non-inventive) |

TABLE 3a

Forced application on 155 g/m² cotton poplin
Test results
Amount used of preparation (Z): 40 g/l water
Wet pick-up: 80%
Drying and curing: 2 minutes at 170° C.

|  |  |  | inventive | | | | | | | | | | | |
|---|---|---|---|---|---|---|---|---|---|---|---|---|---|---|
|  | Preparation (Z) as per Tab. 2a/2b | | 1 | 2 | 3 | 4 | 5 | 6 | 7 | 8 | 9 | 10 | 11 | 12 |
| Original | AATCC Standard Test Method 22 | | 100 | 100 | 100 | 100 | 100 | 100 | 100 | 100 | 100 | 100 | 100 | 100 |
|  | DIN 53 888 bead-off effect | | 5 | 4 | 4 | 5 | 4 | 4 | 4 | 4 | 4 | 4 | 3 | 3 |
|  | DIN 53 888 water absorption in % | | 14 | 19 | 17 | 13 | 21 | 20 | 19 | 16 | 20 | 18 | 24 | 23 |
| After 3 × | AATCC Standard Test Method 22 | | 90 | 90 | 90 | 100 | 90 | 90 | 90 | 90 | 90 | 90 | 80 | 90 |
| 60° C. | DIN 53 888 bead-off effect | | 1 | 1 | 1 | 2 | 1 | 1 | 1 | 1 | 1 | 1 | 1 | 1 |
| washes* | DIN 53 888 water absorption in % | | 31 | 34 | 34 | 28 | 30 | 32 | 31 | 34 | 32 | 31 | 36 | 32 |

|  |  |  | inventive | | | | | | non-inventive | | | | | |
|---|---|---|---|---|---|---|---|---|---|---|---|---|---|---|
|  | Preparation (Z) as per Tab. 2a/2b | | 13 | 14 | 15 | 16 | 17 | 18 | 19 | 20 | 21 | 22 | 23 | 24 |
| Original | AATCC Standard Test Method 22 | | 100 | 100 | 100 | 100 | 100 | 100 | 70 | 90 | 70 | 90 | 70 | 70 |
|  | DIN 53 888 bead-off effect | | 3 | 4 | 5 | 4 | 3 | 2 | 1 | 1 | 1 | 1 | 1 | 1 |
|  | DIN 53 888 water absorption in % | | 21 | 17 | 13 | 19 | 22 | 27 | 38 | 31 | 36 | 29 | 40 | 37 |
| After 3 × | AATCC Standard Test Method 22 | | 80 | 90 | 100 | 90 | 80 | 80 | 50 | 70 | 50 | 70 | 50 | 50 |
| 60° C. | DIN 53 888 bead-off effect | | 1 | 1 | 2 | 1 | 1 | 1 | 1 | 1 | 1 | 1 | 1 | 1 |
| washes* | DIN 53 888 water absorption in % | | 36 | 33 | 28 | 31 | 35 | 37 | 51 | 42 | 55 | 43 | 54 | 57 |

*= as per EN ISO 6330:2000; linen drying (method A)

TABLE 3b

Forced application on 125 g/m² woven polyester fabric one-sidedly laminated with polyurethane film
Test results
Amount used of preparation (Z): 40 g/l water
Wet pick-up: 60%
Drying and curing: 2 minutes at 170° C.

|  |  |  | inventive | | | | | | | | | | | |
|---|---|---|---|---|---|---|---|---|---|---|---|---|---|---|
|  | Preparation (Z) as per Tab. 2a/2b | | 1 | 2 | 3 | 4 | 5 | 6 | 7 | 8 | 9 | 10 | 11 | 12 |
| Original | AATCC Standard Test Method 22 | | 100 | 100 | 100 | 100 | 100 | 100 | 100 | 100 | 100 | 100 | 100 | 100 |
|  | DIN 53 888 bead-off effect | | 5 | 5 | 4 | 5 | 4 | 5 | 5 | 4 | 5 | 4 | 3 | 4 |
|  | DIN 53 888 water absorption in % | | 11 | 13 | 15 | 12 | 16 | 11 | 12 | 16 | 10 | 15 | 21 | 18 |
| After 3 × | AATCC Standard Test Method 22 | | 90 | 90 | 90 | 100 | 90 | 90 | 90 | 90 | 90 | 90 | 90 | 90 |
| 60° C. | DIN 53 888 bead-off effect | | 1 | 1 | 1 | 2 | 1 | 1 | 1 | 1 | 1 | 1 | 1 | 1 |
| washes* | DIN 53 888 water absorption in % | | 30 | 34 | 32 | 26 | 29 | 29 | 28 | 31 | 30 | 29 | 33 | 30 |

|  |  |  | inventive | | | | | | non-inventive | | | | | |
|---|---|---|---|---|---|---|---|---|---|---|---|---|---|---|
|  | Preparation (Z) as per Tab. 2a/2b | | 13 | 14 | 15 | 16 | 17 | 18 | 19 | 20 | 21 | 22 | 23 | 24 |
| Original | AATCC Standard Test Method 22 | | 100 | 100 | 100 | 100 | 100 | 100 | 80 | 90 | 80 | 100 | 80 | 80 |
|  | DIN 53 888 bead-off effect | | 3 | 4 | 5 | 4 | 3 | 3 | 1 | 1 | 1 | 1 | 1 | 1 |
|  | DIN 53 888 water absorption in % | | 23 | 15 | 13 | 18 | 22 | 24 | 30 | 29 | 35 | 27 | 33 | 34 |
| After 3 × | AATCC Standard Test Method 22 | | 80 | 90 | 100 | 90 | 80 | 80 | 70 | 70 | 50 | 70 | 50 | 50 |
| 60° C. | DIN 53 888 bead-off effect | | 1 | 1 | 2 | 1 | 1 | 1 | 1 | 1 | 1 | 1 | 1 | 1 |
| washes* | DIN 53 888 water absorption in % | | 34 | 33 | 25 | 30 | 35 | 36 | 48 | 45 | 53 | 42 | 51 | 55 |

*= as per EN ISO 6330:2000; linen drying (method A)

TABLE 4

Force application on 125 g/m² woven polyester fabric one-sidedly laminated with polyurethane film
Test results
Amount used of preparation (Z): 80 g/l water
Wet pick-up: 60%
Drying and curing: 2 minutes at 170° C.

|  | Preparation (Z) as per | inventive | | | | | | | | | | | | | | | | | | non-inventive | | | | | |
|---|---|---|---|---|---|---|---|---|---|---|---|---|---|---|---|---|---|---|---|---|---|---|---|---|---|
|  | Tab. 2a/2b | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| Original | ISO 11092 $R_{et}$ value | 5 | 10 | 6 | 13 | 8 | 12 | 6 | 11 | 4 | 10 | 7 | 14 | 9 | 8 | 12 | 11 | 8 | 9 | 18 | 22 | 32 | 26 | 39 | 45 |

What is claimed is:

1. A fluorocarbon polymer-free composition based on water and/or organic solvents, comprising:

(1) 10-90% of a hydrophobic reaction product (S) obtained by reacting a component (A) of:

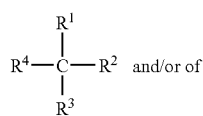

formula (I)

and/or of

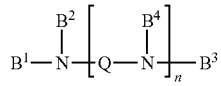

formula (II)

where $R^1$ is a hydrophobic residue of a connotation —X—Y—Z or —Z, where

X is $-(CH_2)_{n''}-$,

Y is 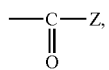,

Z is $-(CH_2)_m-CH_3$, $R^2$ is a residue of composition:

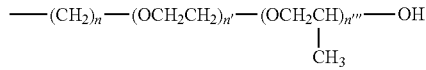

$R^3$ is a hydrophobic residue of connotation —X—Y—Z, —Z or —Y—Z, wherein for the —Y—Z connotation n'' always replaces n in the $R^2$ residue, $R^4$ is a residue of connotation —X—Y—Z or $-(CH_2)_nH$, $B^1$ is a hydrophobic residue of connotation —V—W—Z or —Z, where V is $-(CH_2)_{n''}-$ or

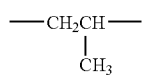

W is 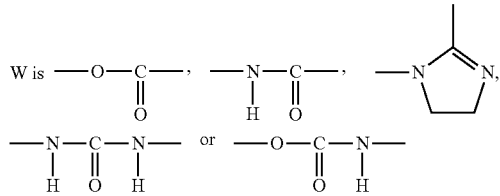

$B^2$ is 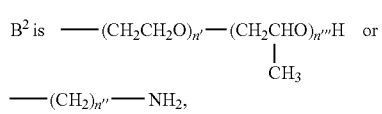

$B^3$ is a hydrophobic residue of the connotation —V—W—Z, —Z or

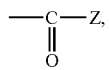

$B^4$ is —V—W—Z or

—C—Z,
‖
O and

Q is $-(CH_2)_{n''}-$, n, n', n'', n''' and m are independently integers of the connotation n=0-2, n'=0-4, n''=1-4, n'''=0-4 and m=12-26, with a partially blocked or non-blocked di-, tri- or polyisocyanate (IC), wherein a fraction of free NCO groups is between 1.8 and 10 per mole and a ratio of free NCO groups to reactive groups in a compound of formulae (I) and/or (II) is in a range from 1:1 to 1:1.3, (2) 10-90% of a $C_8$-$C_{20}$-alkyl groups containing organopolysiloxane constructed of structural units of formulae (IIIa), (IIIb), (IIIc), and (IV),

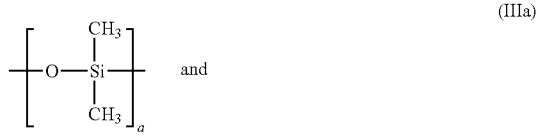

(IIIa)

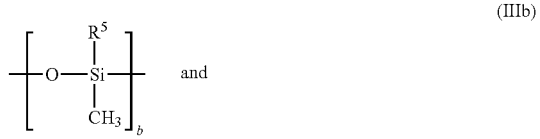

(IIIb)

(IIIc)

(IV)

and end groups of formulae (Va), and/or (Vb), and/or (Vc)

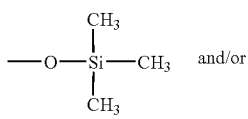

(Va) and/or

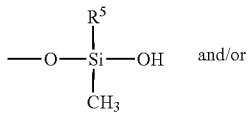

(Vb) and/or

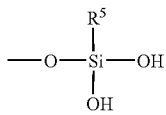

(Vc)

where $R^5$ in formulae (IIIb), (IIIc), (IV), (Vb) and (Vc) are each independently a linear or branched $C_8$-$C_{28}$-alkyl residue or a residue of connotation:

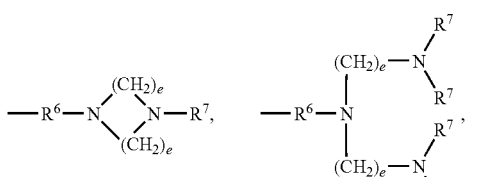

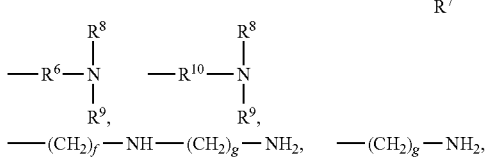

—(CH$_2$)$_f$—NH—(CH$_2$)$_g$—NH$_2$,    —(CH$_2$)$_g$—NH$_2$,

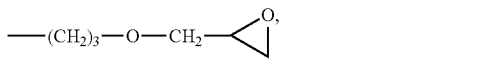

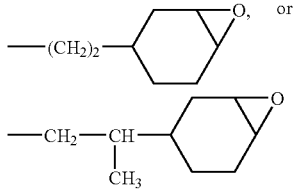

where $R^6$ is a residue of connotation:

—(CH$_2$)$_3$—O—CH$_2$—CH—CH$_2$—,
                        |
                        OH

—(CH$_2$)$_3$—O—CH$_2$—CH—
                        |
                        CH$_2$—OH,

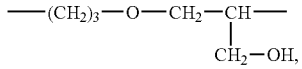

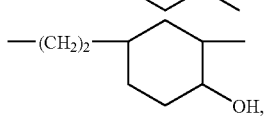

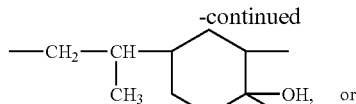

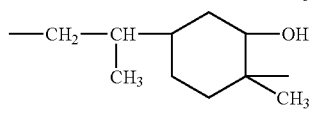

$R^7$ is a linear or branched $C_1$-$C_4$-alkyl residue,
$R^8$ and $R^9$ are identical or different, linear or branched $C_1$-$C_{18}$-alkyl residues,
$R^{10}$ is a residue of the connotation
—(CH$_2$)$_3$— or

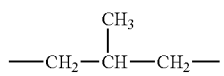

a=an integer from 0-700,
b=an integer from 0-900,
c=an integer from 0-200,
d=an integer from 0-100,
where a+b+c+d=10-1000 and
b+c is ≥10,
e=the integer 2 or 3,
f=the integer 2 or 3,
g=the integer 2 or 3,
wherein a total nitrogen content of the organopolysiloxane is 0.15-1.00 weight percent, an epoxy equivalent of the organopolysiloxane is 1000-25,000 g/eq and a content of $C_8$-$C_{28}$-alkyl residues in the organopolysiloxane is 25-86 weight percent,
(3) 0-45% of a blocked or non-blocked di-, tri- or polyisocyanate, and
(4) optionally, an emulsifier.

2. The composition according to claim 1, in combination with a flat material, wherein the composition is applied as a finish to the flat material.

3. The composition according to claim 2, wherein the flat material comprises a textile substrate, paper, leather or mineral flat material.

4. The composition according to claim 2, configured for spray application, brush application or sponge application.

5. The composition according to claim 2, further comprising an organic solvent for application by drenching, dipping or spraying.

6. A treated textile obtained by applying the composition according to claim 1 on a textile substrate by a process of forced application or by an exhaust method.

7. A treated textile obtained by applying the composition according to claim 1 on a textile substrate by a process of an aftertreatment of a washed textile.

8. A process for producing a textile, comprising:
a) preparing the fluorocarbon polymer-free composition based on water and/or organic solvents according to claim 1; and
b) applying the composition as a finish to textile substrates.

9. Process according to claim 8, comprising:
applying the composition by spray application, brush application or sponge application.

10. Process according to claim 8, comprising:
combining the composition with organic solvents, and applying the preparations by drenching, dipping or spraying.

11. Process according to claim 8, comprising:
applying the composition by force or as an exhaust.

12. Process according to claim 8, comprising:
applying the composition as an aftertreatment of washed textiles.

13. A process of preparing a flat material, the process comprising applying the composition according to claim 1 to a flat material.

* * * * *